Patented Feb. 6, 1951

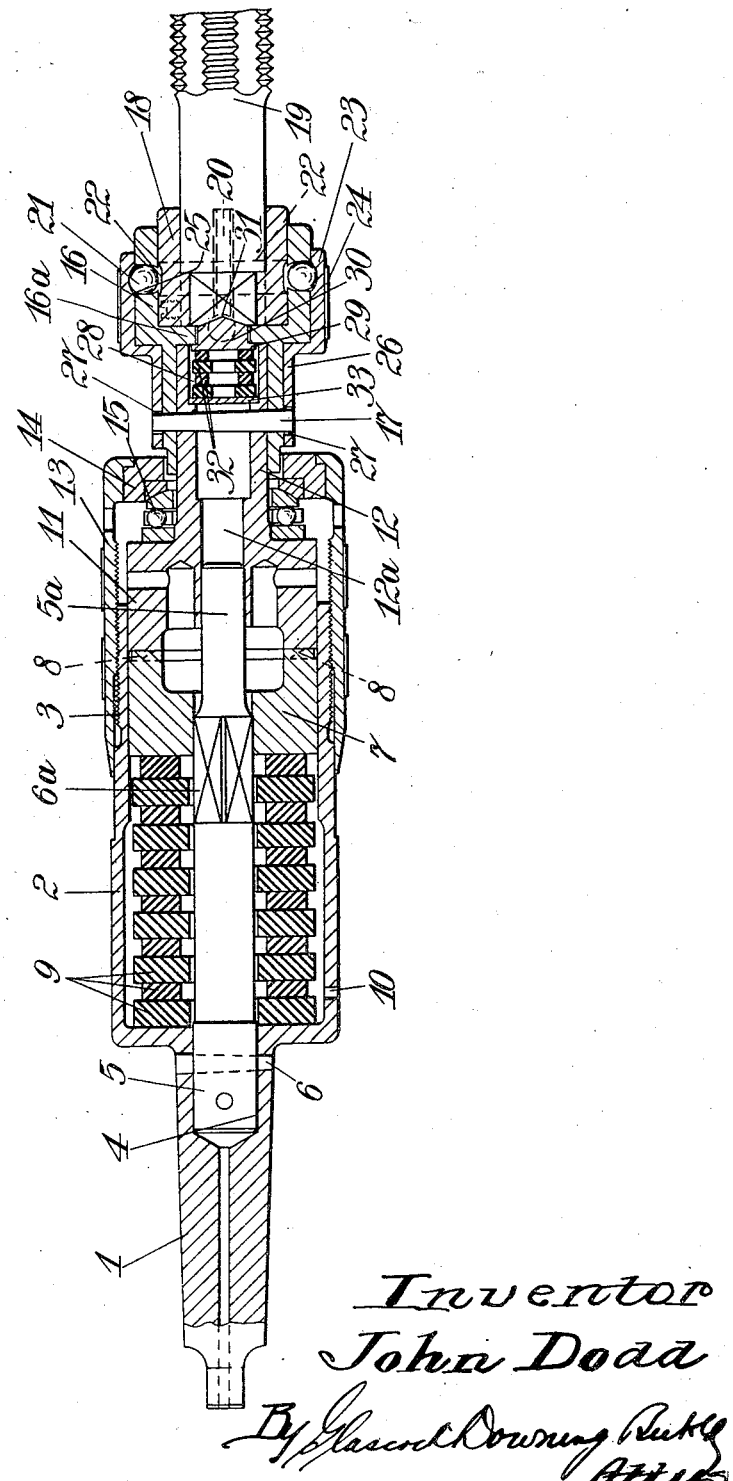

2,540,513

UNITED STATES PATENT OFFICE 2,540,513

ATTACHMENT FOR TAPPING HOLES, SCREWING UP STUDS, AND LIKE OPERATIONS

John Dodd, Greenock, Scotland

Application July 26, 1946, Serial No. 686,404
In Great Britain August 29, 1945

9 Claims. (Cl. 10—135)

This invention has reference to attachments for tapping holes, screwing up studs and like operations and relates particularly to such attachments of the type embodying an adjustably loaded slipping clutch through which the drive is transmitted to the tool and which yields or slips when the tapping, screwing up or like operation is completed.

The present invention has for its object to provide an improved tool of this type which will have a long life without renewal of the means by which the clutch members are held in engagement.

Another object is to provide improvements in such tools whereby with a simple adjustment the slipping clutch can be rendered suitable for use with tapping tools of various sizes without the necessity of employing long heavy compression springs heretofore found necessary when used with the larger sizes of tapping tools.

A further object of the invention is to provide improvements in attachments of the type set forth whereby the tapping tool is more effectively centralised both during the tapping operation and during the withdrawal of the tool, and whereby the tapping tool when being withdrawn will not injure the flanks of the thread cut thereby.

According to the present invention in an attachment of the type set forth for tapping holes, screwing up studs and like operations the slipping clutch members are normally held in engagement solely by means of a resilient cushion formed of rubber or like resilient material and which cushion can be displaced or deformed more or less to regulate the pressure by which the clutch members are held in engagement.

The resilient cushion may be in the form of a cylinder of rubber or like resilient material, and is conveniently formed of a series of superimposed annular rubber or like rings.

The invention further consists in an attachment for tapping holes as set forth in either of the preceding paragraphs having a yielding resiliently loaded centering pin to co-operate with the end of the tapping tool, said pin yielding during the tapping operation, and when the drive of the attachment is reversed to withdraw the tool, the pin, by reason of it being resiliently loaded, continues to bear on the tapping tool. By the provision of such resiliently loaded tapping tool the truth or alignment of the tapping tool is controlled both during the tapping operation and during the withdrawal of the tool and consequently the flanks of the thread are not injured during the withdrawal.

The invention also consists in an attachment as set forth in the preceding paragraph wherein the pin is resiliently loaded by means of a cushion formed of rubber (natural or artificial).

The invention will now be described with reference to the annexed drawing which shows in section an attachment for tapping tools together with a tapping tool in accordance with the invention.

The attachment illustrated comprises a tapered or parallel shank 1 for attachment to a drilling or like machine and which shank has formed integral therewith or has secured thereto a cylindrical casing 2 externally screw threaded as at 3 for a portion of its length.

In a socket 4 formed in the shank is inserted the end of a spindle 5 made fast to the shank by means of a transverse driving pin 6. Said spindle is squared or provided with flat faces 6ª and fitted thereon so as to be capable of relative axial movement is the driving member 7 of the clutch, said member being in the form of a broad annular ring having clutch teeth 8 on one face thereof. Interposed between the closed end of the casing and the driving clutch member is a cushion formed of a series of annular rubber (artificial or natural) rings 9 which encircle the spindle 5, there being a substantial clearance between the said spindle and the rings and between the rings and the wall of the casing. Further, one or more air release holes 10 is or are provided in the part of the casing housing the rings.

Alternate rings may be of relatively soft and hard rubber and further alternate rings may be of slightly less external and internal diameter than the adjacent rings.

The inner wall of said cylindrical casing may be counterbored, i. e. is of increased diameter to accommodate the displaced cushion.

Co-operating with the driving member of the clutch is the driven member 11 which is in the form of a broad ring having co-operating clutch teeth on the face opposed to the driving member and provided with an axial extension 12 and bore 12ª. The end 5ª of the spindle 5 fits into the bore of the driven member but it will be understood that the latter is not driven directly by said end of the spindle, which is cylindrical, but only through the driving member 7 of the clutch.

It will be noted that the extension 5ª of the spindle 5 acts as a guide for the driven member of the clutch so that both clutch members are maintained in axial alignment.

Screwed on to the cylindrical casing is a flanged sleeve 13, which receives a ball race collar 14, a self-centering ball thrust bearing 15 being interposed between the collar and a shoulder formed on the driven member of the clutch.

The extension 12 of the driven member, which extension extends beyond the flanged end of the sleeve 13, has fitted thereon a holder 16, an internal flange 16ª of the holder abutting against the end of the aforesaid extension 12. Said holder is provided with a sleeve which encloses said extension and is secured thereto by means of a transverse driving pin 17. Fitted in the holder is an adaptor 18 to receive and drive the tapping or other tool 19. The adaptor is secured in the holder to prevent relative rotary movement by means of diametrically opposite keys 20 inserted in keyways cut in the adaptor and in the holder.

The adaptor is removably secured in the holder by any suitable means such as a pair of steel balls 21 located in holes in the wall of the holder and, when moved radially inwards, engaging an annular channel 22 in the adaptor. Said balls are forced inwards by means of a sleeve 23 knurled as at 24 and snugly enclosing the holder, the sleeve being provided with diametrically opposite recesses 25. The sleeve is also provided with an extension 26 of reduced diameter which is provided with circumferential slots 27. The pin 17 extends through the slots. By rotating the sleeve 23 relative to the holder the balls can be forced into the annular channel 22 so that the balls then prevent the withdrawal of the adaptor from the holder. Also by rotating the sleeve so that the recesses 25 register with the balls the latter can move clear of the annular recess to permit withdrawal of the adaptor.

The end of the axial extension 12 is counterbored as at 28 to receive the flanged end 29 of a cylindrical body 30 having a centering pin 31, said flanged end bearing on the shoulder 16ª of the holder 16. Incorporated in said counterbored end is a series of superimposed rubber (either natural or artifical) rings 32, alternate rings being of smaller diameter than the others. The cushion formed by said rings bears at one end on a circular plate 33 which seats on the shoulder formed at the inner end of the counter-bored end of the extension, while the other end of the cushion bears against the flanged end 29 of the cylindrical body.

It will be appreciated that the resilient cushion formed by the rings serves to urge forward the centering pin against the end of the tapping tool, which at said end is provided with a central concealed recess.

The driven clutch member is provided with a number of recesses drilled therein which recesses are packed by a suitable lubricant. A number of said recesses communicate with passages by which lubricant is conveyed to lubricate the inner wall of casing 2, while the others are provided with passages by which lubricant is conveyed to lubricate the end of the spindle 5ª, which is fitted in the driven member of the clutch.

To use the improved attachment a tapping tool appropriate for the hole to be tapped and an adaptor suitable for the tool are selected, the tool being inserted in the adaptor and the latter inserted in the holder. The sleeve 23 is then given a partial rotation, the slots 27 permitting of such movement, and the steel balls thereby forced into engagement with the annular recess 22 so that displacement of the holder is prevented.

The sleeve 13 is then screwed on the casing 2 so that, through the thrust bearing 15 and the driven and driving members of the clutch, the rubber forming the resilient rings 9 is displaced or distorted, the extent of displacement or distortion determining the pressure by which the clutch members are held in operative engagement. Such pressure will be varied according to the requirements to which the attachment is put and to facilitate regulation suitable graduations may be marked on the casing. When the resistance encountered by the tool reaches a predetermined degree the clutch slips.

It will be noted that the clutch members are held in engagement solely by the pressure exerted by the rubber or like rings and without the assistance of metallic springs or air under pressure.

When the hole is being tapped the centering pin 31, which bears centrally on the end of the tapping tool 9, yields against the action of its cushion formed by the rings 32. Therefore throughout the tapping operation the pin is held in engagement with the tapping tool so that the truth or alignment or the centralising of the tapping tool is controlled throughout the tapping operation. When the attachment is rotated in the reverse direction to withdraw the tool, said cushion maintains the centering pin against the tapping tool so that the truth or alignment of the tapping tool is maintained during the withdrawal movement and this ensures that the tool will not injure the flanks of the thread cut thereby.

I claim:

1. An attachment for use in tapping holes, screwing up studs and like operations comprising a shank for attachment to a rotary driving member, a clutch driving member driven by said shank, a driven clutch member, co-operating teeth carried by both clutch members, which teeth override when a predetermined resistance is encountered by the driven member, a rubber cushion positioned between said shank and said driving clutch member and of greater axial length than transverse diameter and formed of a series of superimposed rubber rings and variably pressing said clutch members together so that the clutch members are normally held in engagement, means by which the rubber cushion is maintained under compression and by which the degree of compression can be altered to suit the pressure at which the teeth are to override, and means carried by the driven member for holding a tool appropriate for the work to be done.

2. An attachment for use in tapping holes, screwing up studs and the like operations comprising a shank for attachment to a rotary driving member, a clutch driving member driven by said shank, a driven clutch member, co-operating teeth carried by both clutch members, which teeth override when a predetermined resistance is encountered by the driven member, a rubber cushion positioned between said shank and said driving clutch member and of greater axial length than transverse width maintained under compression and by which the clutch members are normally held in engagement, means variably pressing said clutch members together toward said cushion so that the degree of compression in said rubber cushion can be altered to suit the pressure at which the teeth are to override, a holder carried by the driven member for holding a tool appropriate for the work to be done, a centering pin carried by the holder and a rubber cushion interposed between the holder and the inner end of the centering pin.

3. A tool for use in tapping holes, screwing up studs and like operations comprising a shank for attachment to a rotary driving member, a cylindrical casing carried by the shank, a spindle secured to the shank and co-axial with the casing, a driving clutch member non-rotatably mounted on but capable of axial movement with respect to the spindle, a rubber cushion of greater axial length than transverse width encircling the spindle and interposed between the end of the casing and the driving clutch member, a driven clutch member also located within the casing, co-operating teeth carried by both clutch members, which teeth override when a predetermined resistance is encountered by the driven member, a flanged sleeve screwed on the said casing, and by which the rubber cushion can be placed under compression to exert a predetermined pressure on the driving member of the clutch, and tool carrying means carried by the driven member of the clutch.

4. A tool for use in tapping holes, screwing up studs and like operations comprising a shank for attachment to a rotary driving member, a cylindrical casing carried by the shank, a spindle secured to the shank and co-axial with the casing, a driving clutch member non-rotatably mounted on but capable of axial movement with respect to the spindle, a rubber cushion of greater axial length than transverse width encircling the spindle and interposed between the end of the casing and the driving clutch member, a driven clutch member also located within the casing, co-operating teeth carried by both clutch members, which teeth override when a predetermined resistance is encountered by the driven member, a flanged sleeve screwed on the said casing and by which the rubber cushion can be placed under compression to exert a predetermined pressure on the driving member of the clutch, a tool holder secured to the driven clutch member, an adaptor fitted in said holder, a centering pin fitted in the holder and a rubber cushion located between the inner end of the centering pin and the holder.

5. A driving device for a tapping tool or the like comprising a shank adapted to be held by a tool-turning head and carrying an outer shell casing rigid with said shank, a hollow cylindrical member adjustably carried by said casing, inner and outer cooperatively toothed clutch members both axially sliding in said casing, means keying said inner toothed member to said shank, a resilient member within said casing pressing against said inner clutch member and permanently rotatable with said shank, an anti-friction bearing axially intervening between said adjustable cylindrical member and said outer clutch member to transmit the adjustment of said cylindrical member through said outer clutch member to said inner clutch member, so that said clutch members are variably compressed between said anti-friction member and said resilient member, and means at the outer end of said outer clutch member for detachably connecting a tool thereto.

6. A driving device as set forth in claim 5 in which the resilient member is of resilient rubber-like material and of greater axial length than transverse width and adapted to be compressed to predetermined axial lengths by relative adjustment of said casing and said cylindrical member.

7. A driving device for a tapping tool or the like comprising a shank adapted to be held by a tool-turning head and carrying an outer shell casing and an inner spindle both rotatably fixed relative to said shank, an annular resilient member within the said casing and surrounding the spindle, an inner driving toothed clutch member permanently connected to rotate with said shank and engaging the end of said annular resilient member and slidably mounted between said spindle and said casing, an outer cooperating toothed driven clutch member slidable axially and relatively rotatable in said casing, annular means adjustably pressing said outer clutch member inwardly against said inner clutch member and said resilient member to vary the axial compression of said resilient member and the resultant pressure between said cooperating clutch teeth, and means carried by the outer end of said outer clutch member for detachably connecting a tool thereto.

8. A driving device as set forth in claim 7 in which said annular resilient member is of resilient rubber-like material and of greater axial length than transverse width and adapted to be compressed to predetermined axial lengths by relative adjustment of said casing and said cylindrical member.

9. A driving device as set forth in claim 7 in which the spindle rotating with said shank extends axially into engagement with both of the clutch members.

JOHN DODD.

REFERENCES CITED

The following references are of record in the file of this patent:

UNITED STATES PATENTS

| Number | Name | Date |
|---|---|---|
| 357,025 | Pearn | Feb. 1, 1887 |
| 632,810 | Errington | Sept. 12, 1899 |
| 768,202 | Suppes | Aug. 23, 1904 |
| 915,568 | Douglas | Mar. 16, 1909 |
| 1,657,274 | Niedhammer | Jan. 24, 1928 |
| 1,828,370 | Huddle | Oct. 20, 1931 |
| 1,974,345 | Scholtes | Sept. 18, 1934 |
| 2,244,143 | Dowler | June 3, 1941 |